United States Patent
Pakanati et al.

(10) Patent No.: US 12,254,366 B2
(45) Date of Patent: Mar. 18, 2025

(54) SYSTEM TO TRACK HOT-SECTION FLOWPATH COMPONENTS IN ASSEMBLED CONDITION USING HIGH TEMPERATURE MATERIAL MARKERS

(71) Applicants: General Electric Company, Schenectady, NY (US); Indian Institute of Science, Bengaluru (IN)

(72) Inventors: Sridhar Pakanati, Bangalore (IN); Srinivasan Swaminathan, Bangalore (IN); Arindam Ghosh, Bangalore (IN); Ambarish Ghosh, Bangalore (IN); Gayathri Honnenahalli Niranjana Murthy, Bangalore (IN)

(73) Assignees: General Electric Company, Schenectady, NY (US); Indian Institute of Science, Bengaluru (IN)

( * ) Notice: Subject to any disclaimer, the term of this patent is extended or adjusted under 35 U.S.C. 154(b) by 0 days.

(21) Appl. No.: 18/710,703

(22) PCT Filed: Nov. 28, 2022

(86) PCT No.: PCT/US2022/051083
§ 371 (c)(1),
(2) Date: May 16, 2024

(87) PCT Pub. No.: WO2023/097079
PCT Pub. Date: Jun. 1, 2023

(65) Prior Publication Data
US 2024/0338543 A1   Oct. 10, 2024

(30) Foreign Application Priority Data
Nov. 29, 2021   (IN) ............................. 202141055216

(51) Int. Cl.
*G06K 19/06*   (2006.01)

(52) U.S. Cl.
CPC .............................. *G06K 19/06037* (2013.01)

(58) Field of Classification Search
CPC ........................ G06K 19/06037; G06K 19/00
(Continued)

(56) References Cited

U.S. PATENT DOCUMENTS

| 5,922,622 A | 7/1999 | Lee |
| 6,869,022 B2 | 3/2005 | Corby, Jr. |

(Continued)

FOREIGN PATENT DOCUMENTS

| CN | 101456331 | 7/2012 |
| CN | 104927420 | 9/2015 |

(Continued)

OTHER PUBLICATIONS

International Search Report and Written Opinion of PCT/US2022/051083, mailed Mar. 17, 2023, 15 pages.

*Primary Examiner* — Edwyn Labaze
(74) *Attorney, Agent, or Firm* — Fitch, Even, Tabin & Flannery LLP

(57) ABSTRACT

There is provided markers, systems, and methods for creating and utilizing a marker containing identification information. The embodiments include an identifying marker comprised of high temperature material for tracking a component in a high temperature environment. The marker may be disposed on the component such that the marker is subject to high temperatures while affixed to the component. The marker may provide the ability to track a history of the component the marker is attached to for maintenance.

19 Claims, 17 Drawing Sheets

(58) Field of Classification Search
USPC .................................. 235/494, 462.01, 487
See application file for complete search history.

(56) References Cited

U.S. PATENT DOCUMENTS

| | | | |
|---|---|---|---|
| 7,266,515 | B2 | 9/2007 | Costello |
| 7,377,181 | B2 | 5/2008 | Christ, Jr. |
| 8,485,038 | B2 | 7/2013 | Sengupta |
| 8,860,227 | B2 | 10/2014 | Usui |
| 8,925,796 | B2 | 1/2015 | Tsuji |
| 2002/0114701 | A1* | 8/2002 | Coulson .................. B22C 7/02 |
| | | | 416/241 R |
| 2006/0131424 | A1 | 6/2006 | Helin |
| 2009/0162561 | A1 | 6/2009 | Kirby |
| 2013/0157009 | A1 | 6/2013 | Kondo |
| 2015/0125670 | A1* | 5/2015 | Szumski ................ B42D 25/47 |
| | | | 156/60 |

FOREIGN PATENT DOCUMENTS

| | | |
|---|---|---|
| CN | 106163729 | 11/2016 |
| EP | 2108715 | 10/2009 |
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |
| GB | 2506413 | 4/2014 |
| JP | 2004095814 A | 3/2004 |
| KR | 100942023 | 2/2010 |
| WO | 0006796 | 2/2000 |
| WO | 2015191181 | 12/2015 |
| WO | 2020142542 | 7/2020 |

* cited by examiner

Colour Chart For Thermally Grown SiO₂ Films

| Film Thickness(A) | Colour | |
|---|---|---|
| 500 | Tan | |
| 700 | Brown | |
| 1000 | Dark Violet To red Violet | |
| 1200 | Royal Blue | |
| 1500 | Light Blue To Metallic Blue | |
| 2000 | Light Gold Or Yellow Slight Metallic | |
| 2700 | Red-Violet | |
| 3100 | Blue | |
| 3400 | Light Green | |
| 3600 | Yellow Green | |
| 3900 | Yellow |  |

146

146

148

148

US 12,254,366 B2

SYSTEM TO TRACK HOT-SECTION FLOWPATH COMPONENTS IN ASSEMBLED CONDITION USING HIGH TEMPERATURE MATERIAL MARKERS

CROSS-REFERENCE TO RELATED APPLICATION

This application is a U.S. national phase application filed under 35 U.S.C. § 371 of International Application No. PCT/US2022/051083, filed Nov. 28, 2022, designating the United States, which claims the benefit of I.N. Provisional Application No. 20/214,1055216, filed on Nov. 29, 2021, all of which are hereby incorporated by reference in their entireties.

TECHNICAL FIELD

The present subject matter relates generally to identifying markers and, more specifically, to high temperature markers for tracking a component used in a high temperature environment, such as a turbine engine.

BACKGROUND

Components in the hot-section flowpath of a turbine engine must withstand thermal cycles and temperatures above 1000° C. Markers for tracking components using markers within the hot-section flowpath must also withstand those temperatures and remain identifiable, visible, and/or readable after such exposure. Maintaining information regarding the components assists proper maintenance of the components. Tracking and maintaining components on-wing helps to perform more efficient and effective repairs.

There is a desire to improve tracking of components in the hot-section flowpath to improve on-wing and/or assembled tracking of components.

BRIEF DESCRIPTION OF THE DRAWINGS

Various needs are at least partially met through provision of the identifying markers described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
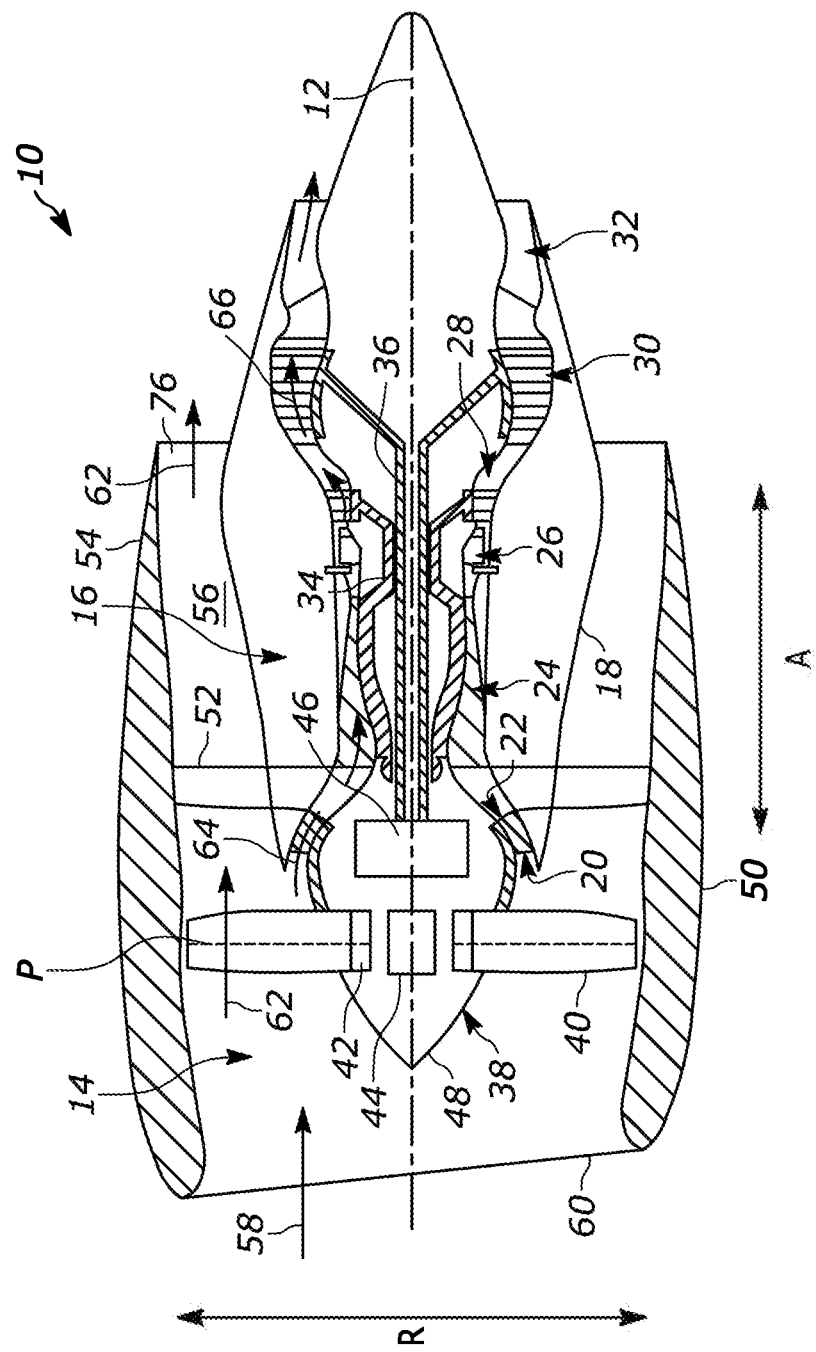
FIG. 1 is a cross-sectional view of a gas turbine engine for an aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common, but well-understood elements that are useful or necessary in a commercially feasible embodiment, are often not depicted to facilitate a less obstructed view of these various embodiments of the present disclosure. Certain actions and/or steps may be described or depicted in a particular order of occurrence while those skilled in the art will understand that such specificity with respect to sequence is not actually required.

DETAILED DESCRIPTION

The following embodiments illustrate marker construction that may be used for tracking components subject to a high temperature environment, such as that in a hot-section flowpath of a turbine engine. More specifically, one or more benefits of tracking components in the hot-section flowpath is an increase in historical information regarding for components. Further, another benefit is the ability to track components while in an assembled state within the turbine engine, which decreases inspection time. These benefits can be accomplished by a marker capable of withstanding temperatures at or above 1350° C. The foregoing and other benefits may become clearer upon making a thorough review and study of the following detailed description.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Referring now to the drawings, wherein identical numerals indicate the same elements throughout the figures, FIG. 1 is a cross-sectional view of a gas turbine engine. The gas turbine engine is a high-bypass turbofan jet engine, referred to herein as "turbofan engine 10." The turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The tubular outer casing 18 encases, in serial flow relationship, a compressor section including a low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) spool 36 drivingly connects the LP turbine 30 to the LP compressor 22.

The fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by low pressure spool 36 across a power gear box 46. The power gear box 46 includes a plurality of gears for stepping down the rotational speed of the LP spool 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion 62 of the air 58 as indicated by arrow is directed or routed into the bypass airflow passage 56 and a second portion 64 of the air 58 as indicated by arrow is directed or routed into the LP compressor 22. The ratio between the first portion 62 of air 58 and the second portion 64 of air 58 is commonly known as a bypass ratio. The pressure of the second portion 64 of air 58 is then increased as it is routed through the HP compressor 24 and into the combustion section 26, where it is mixed with fuel and burned to provide combustion gases 66. Subsequently, the combustion gases 66 are routed through the hot flowpath, or hot-section flowpath, of the HP turbine 28 and the LP turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before it is exhausted from a fan nozzle exhaust section 76 of the turbofan engine 10, also providing propulsive thrust.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2A:
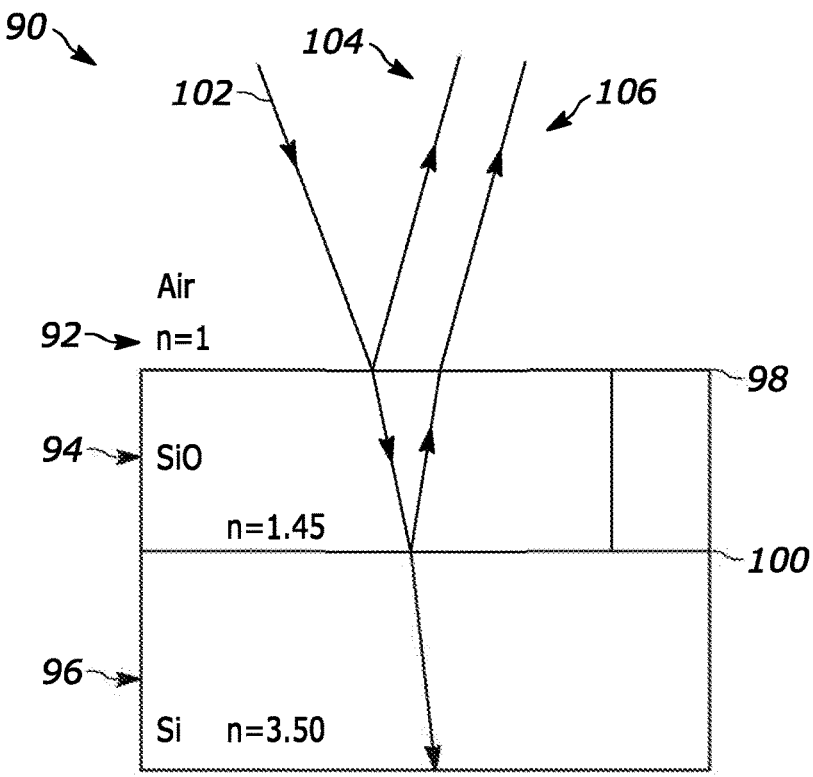
FIG. 2A is an illustration of an optical interference across a silicon dioxide film in accordance with some embodiments.
Figure 2B:
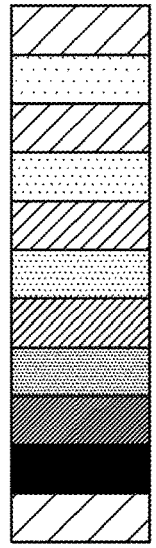
FIG. 2B is an illustration of a color chart of different silicon dioxide thicknesses in accordance with some embodiments.

Referring to FIGS. 2A and 2B, there is an illustration of an optical interference across a silicon dioxide film 90 and a color chart of different silicon dioxide thicknesses. Crystalline silicon may typically oxidize when in contact with oxygen and water to form an oxide layer, containing silicon dioxide. At room temperature, the oxide layer may be about 1.5 nm thick. Hence, an oxide layer may be difficult to avoid when utilizing a silicon wafer. For this purpose, commercially available silicon wafers are processed to have a known oxide thickness which are grown in controlled environments.

A silicon dioxide thin film 94 on top of a surface of a silicon substrate 96 behaves as a semi-transparent layer to minimize contact with the air 92. Thus, when viewed under a microscope, light rays 102 reflect at least from the air and silicon dioxide interface 98 (between air 92 and silicon dioxide thin film 94) and the silicon dioxide and silicon interface 100 (between the silicon dioxide thin film 94 and the silicon substrate 96). The reflected rays 104 from the air and silicon dioxide interface 98 and the reflected rays 106 from the silicon dioxide and silicon interface 100 undergo a phase change of about 180 degrees as compared to the light rays 102. The reflected rays 104 and 106 may be reflected into a lower refractive index medium.

The reflected rays 104 and 106 may interfere and superimpose with one another. While the refractive index of silicon dioxide may be taken as a constant, the index may vary both with respect to the wavelength of incident light as well as the angle of incidence. To determine the intensity of reflected light, the angle and the wavelength are considered, as well as the type of light source and the microscope setup.

The wavelength of visible light which interferes constructively for a given angle and oxide thickness may determine the dominant color in the reflected spectra, as shown in FIG. 2B. The variation of color for different silicon oxide thickness is shown in FIG. 2B. The reflected spectra dependence on the thickness of the oxide layer may be used to generate a pattern which is visible via an optical microscope.

Figure 3A:
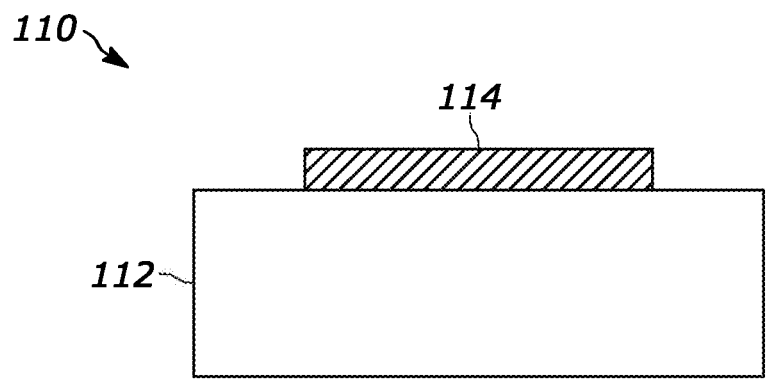
FIG. 3A is an elevational view of a marker in accordance with some embodiments.

Referring to FIG. 3A, there is shown a marker 110 in accordance with some embodiments. The marker 110 comprises a dielectric base material 112 with a top surface with a refractive film 114. The refractive film 114 of the marker 110 has not yet been etched with an identification pattern. The dielectric base material 112 may be comprised of silicon, germanium, titanium, doped silicon, doped germanium, and doped titanium and/or a combination thereof. The refractive film 114 may be comprised of oxides, carbides, nitrides, fluorides, and/or a combination thereof. The refractive film 114 may have a thickness of about 50 Angstroms to 3900 Angstroms. In some other embodiments, the refractive film 114 may have a thickness of about 100 Angstroms to 900 Angstroms.

Figure 3B:
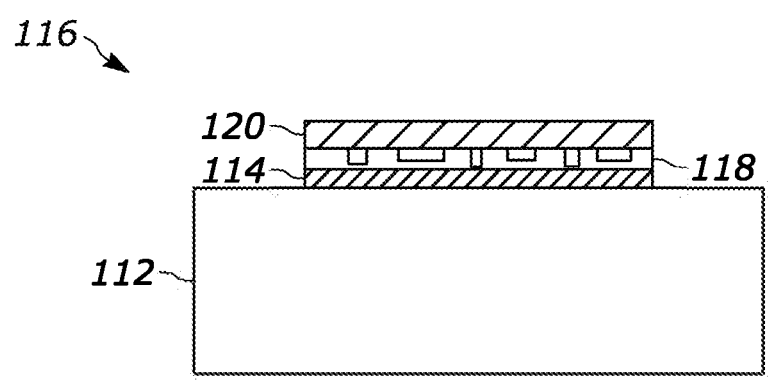
FIG. 3B is an elevational view of a marker in accordance with some embodiments.

Referring to FIG. 3B, there is shown a marker 116 having the refractive film 114 etched with an identification pattern in accordance with some embodiments. The refractive film 114, from FIG. 3A, may be etched to obtain a thickness modulated film 118. The refractive film 114, similar to the silicon dioxide thin film 94, may be etched to different depths to provide for different colors to be reflected. The thickness modulated film 118 may be etched within the refractive film 114, and the etched pattern may have a thickness less than the refractive film 114. The thickness modulated film 118 may include an etched pattern such that a surface of the thickness modulated film 118 is modulated across the refractive film 114. The thickness modulated film 118 may have a thickness that is the thickness of the refractive film 114 such that the thickness modulated film 118 may be disposed on the surface of the dielectric base material 112. The thickness modulated film 118 and the refractive film 114 may be the same material such that the etch depth is defined from the surface of the dielectric base material 112 to the top of the thickness modulated film 118 layer.

Etching the refractive film 114 may be done with a dry etching process, a wet etching process and/or combinations thereof. The thickness modulated film 118 may have a thickness of about 5 nanometers to 390 nanometers. The thickness modulated film 118, or etch depth, may be determined using the differential refractive properties (e.g. dielectric constant) of the dielectric base material 112 and the refractive film 114, as discussed above with reference to FIGS. 2A and 2B. This allows for spectral distribution of reflected light from the refractive film 114 or the thickness modulated film 118 on the dielectric base material 112. The spectral distribution may be highly sensitive to the thickness of the refractive film layer 114 or the thickness modulated film 118 due to the optical interference effect.

A coating of refractive material 120 may be disposed over the surface of the thickness modulated film 118. The refractive material 120 may be comprised of barium fluoride, calcium fluoride, lanthanum fluoride, magnesium fluoride, hafnium oxide, silicon dioxide, aluminum oxide, titanium nitride, and/or a combination thereof to protect the etched pattern.

Etching of the refractive film 114 may be done to achieve or create at least one pattern. In some embodiments, the pattern may be printed onto the refractive film 114 before etching to delineate the pattern to be etched. The thickness modulated film 118 may be created including, containing, or having the pattern that was printed onto the refractive film 114 before etching, similar to that described above with reference to FIGS. 2A and 2B. The pattern after etching may be contained within the thickness modulated film 118 or may be the result of the contrast between the thickness modulated film 118 and the remaining or unetched refractive film 114. The pattern may include features to allow for tracking of the pattern, such that the pattern is an identification pattern. The etching process may further create a pattern that is readable, visible, and/or sensed by an optical sensor. This may occur by the contrast that results from the etching process etching the refractive film 114 to create the thickness modulated film 118.

The dry etching process may comprise at least a portion of the refractive film 114 being sputtered or dissolved using reactive ions or a vapor phase etchant, while the wet etching process may comprise at least a portion of the refractive film 114 being dissolved in a chemical solution. In some embodiments, the etching process may be performed utilizing micro or nano-fabrication technology, an optical lithography technique, or a photon-based technique. In an illustrative embodiment, the etching may utilize an isotropic etching process that includes projecting, or shadow casting, an image on to a photosensitive emulsion or a substrate that is coated with a photoresist coating. In yet another embodiment, the etching process may be chosen to allow for control over the dimension of channels created to make the pattern. The selection of an etching process may also allow for fabrication of patterns on large to submicron scale areas. This may enable the pattern to be disposed on many different sized components. The pattern may be pre-defined by a user or a machine to track and/or pair with components.

Figure 4:
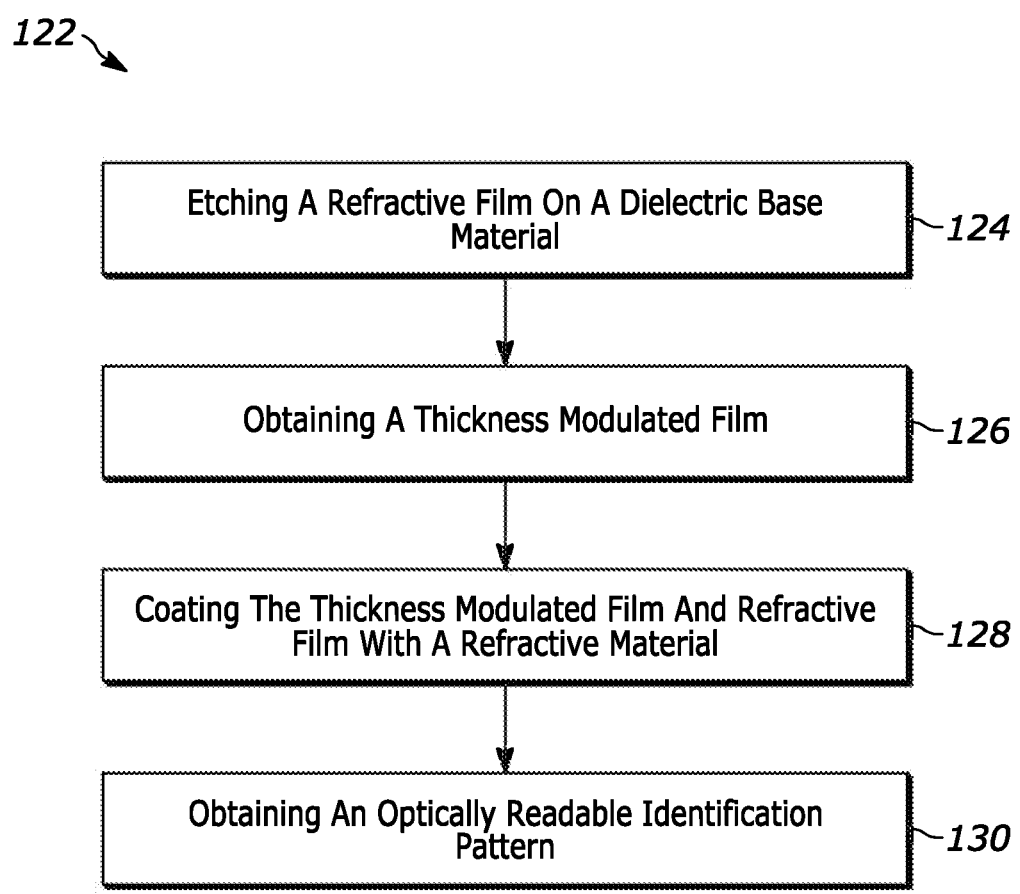
FIG. 4 is flowchart for an exemplary method of forming a marker in accordance with some embodiments.

Referring to FIG. 4, there is a flowchart of an exemplary method 122 of forming the marker 116 in accordance with some embodiments. For example, the method 122 and/or one or more of the steps of the method 122 may be applicable to one or more of the embodiments described herein. The method 122 includes a step 124 of etching the refractive film 114 disposed on a surface of the dielectric base material 112. In addition, the method 122 includes a step 126 of obtaining the thickness modulated film 118. The thickness modulated film 118, as discussed above, may be etched into or out of the refractive film 114. Accordingly, the thickness modulated film 118 and the refractive film 114 may be comprised of the same layer/material. For illustrative purposes, the drawings are shown as having the thickness modulated film 118, or etch depth, as a separate layer from the refractive film 114, however, as previously stated, these two layers may be a single layer/material with the thickness modulated film 118 etched into or out of the refractive film 114. Additionally, the etch depth may have a depth extending from the dielectric base material 112 to the top of the thickness modulated film 118 where the thickness modulated film 118 and a refractive material 120 conjoin. The method 122 further includes a step 128 of coating the thickness modulated film 118 and the refractive film 114 with a refractive material 120. In some embodiments, the refractive film 114 may be coated where the thickness modulated film 118 does not cover the full surface of the refractive film 114 or the refractive film 114 is exposed through the thickness modulated film 118. Moreover, the method 122 includes a step 130 of obtaining an optically readable identification pattern. The optically readable pattern, discussed below in more detail, may be a result of the etching of the refractive film 114 and the subsequent creation of the thickness modulated film 118.

In an illustrative embodiment, the dielectric base material 112, such as a silicon substrate, has the refractive film 114, such as silicon dioxide, disposed on the surface of the dielectric base material 112, collectively referred to as the substrates. The refractive film 114 may have a thickness of about 280 nm. The substrates may be subjected to standard wafer cleaning procedures, which may involve sonicating the substrates in acetone followed by washing in isopropyl alcohol and deionized water.

An identification pattern may be printed onto the refractive film 114 using optical lithography and buffered-HF treatment. The identification pattern may be drawn using AutoCAD software and then converted into the appropriate format. The dimensions of the identification pattern may be chosen to ensure easy optical imaging via a microscope and surface profile measurements via Atomic Force Microscopy (AFM) and Dektak Surface Profiler. The lithography may be done in a Microtech LW-405 instrument. A laser writer may be used, employing rasterization, to write the identification pattern onto the refractive film 114. A sample wavelength used was 405 nm, which lies in the ultraviolet (UV) spectrum. A positive photoresist (S1813) may be spin-coated onto the refractive film 114 followed by a pre-heat treating. Positive photoresist is sensitive to the UV spectrum, but insensitive to the visible range. MF26A, a chemical used as a photoresist developer commonly used in optical lithography, was used to develop the identification pattern after exposure.

After exposure and development, a post-heat treating may be done to ensure that the buffered-HF selectively etches the refractive film 114 to obtain the thickness modulated film 118. For etching, the marker 116 may be dipped in buffered-HF followed by a deionized water rinse to wash out the acid and stop the etching process. After etching, the marker 116, having the thickness modulated film 118 may then be dipped in isopropyl alcohol to remove any organic residues. This step may remove the photoresist. The marker 116 may be dried using a nitrogen gun. Atomic Layer Deposition (ALD) may be used to deposit the refractive material 120, such as aluminum oxide, over the marker 116, and specifically the thickness modulated film 118, as a masking layer and/or coating.

Figure 5A:
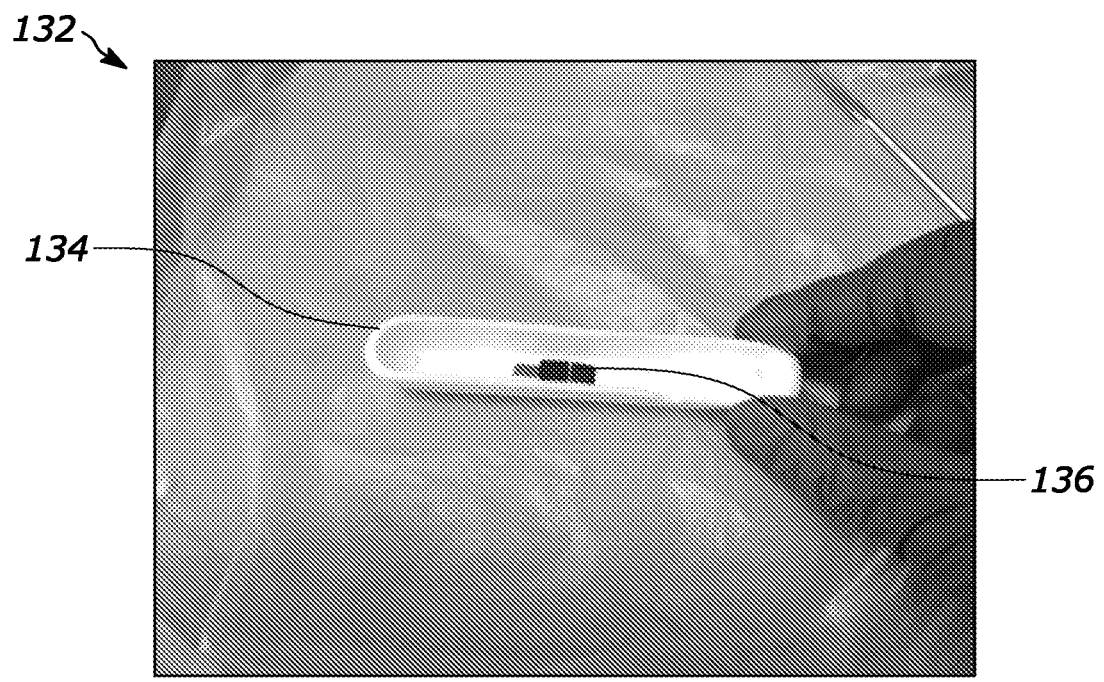
FIG. 5A is a top view of a marker contained within a test tray.
Figure 5B:
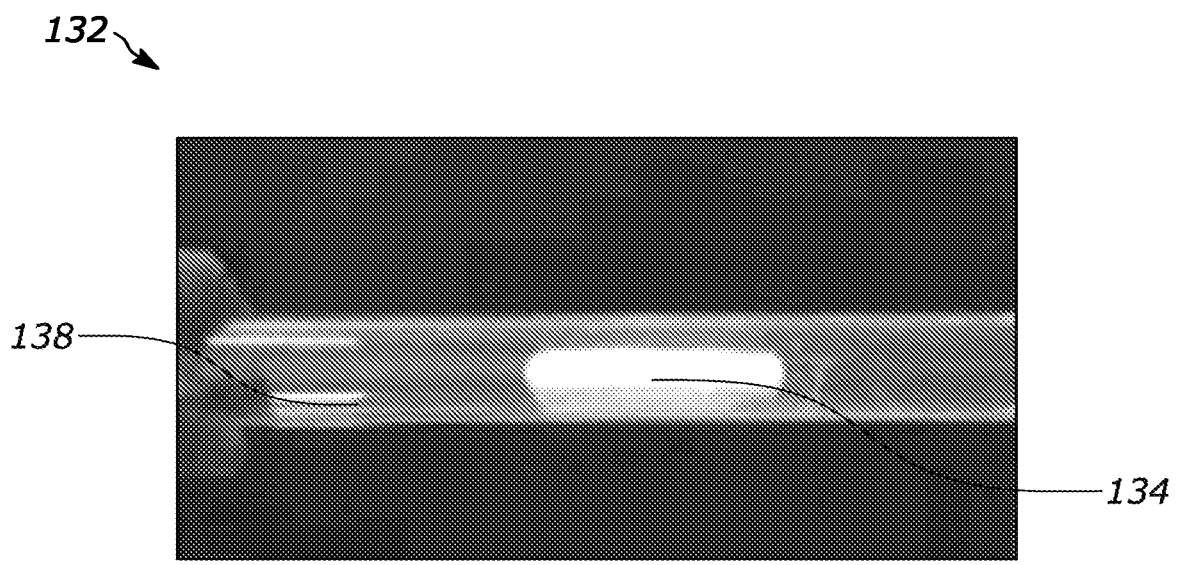
FIG. 5B is a side view of the test tray disposed in a quartz tube.
Figure 5C:
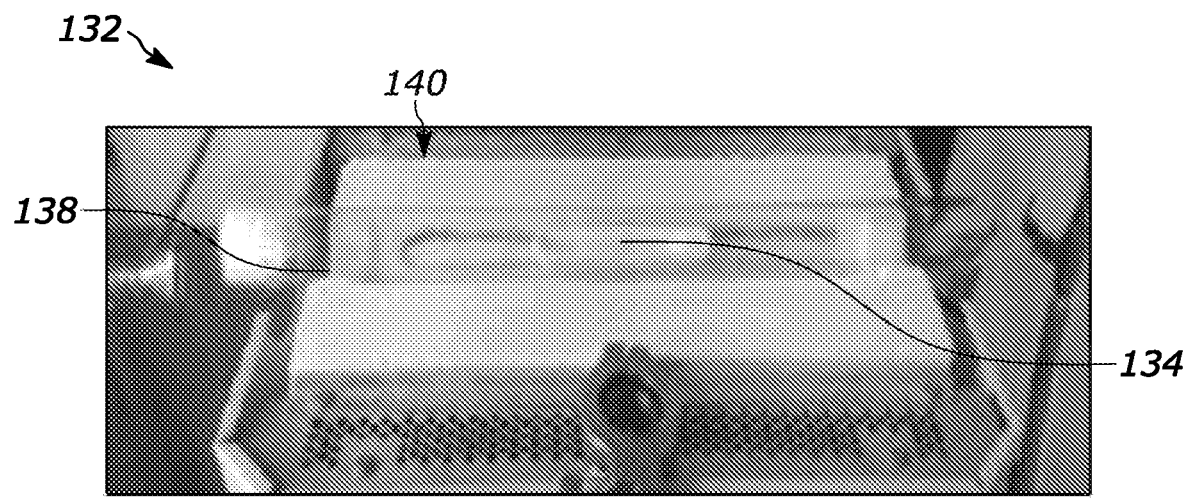
FIG. 5C is a perspective view of the quartz tube and test tray disposed within a furnace.

Referring to FIGS. 5A to 5C, a marker, similar to that described with reference to FIG. 3B, is illustrated undergoing thermal heating. The testing set-up 132 is shown having a marker 136 loaded into a tray 134. The tray 134 may then be loaded into a test tube 138. The tray 134 and test tube 138 may be disposed in a furnace 140 for thermal heating of the marker 136. The test tube 138 may be kept open to ensure thermal treatment in the atmospheric condition. The furnace 140 may be operated in the proportional-integral-differential (PID) controlled mode. The automatic tuning of the PID may be set to active, that is, the PID values are optimized by the temperature controller of the furnace 140 to ensure that the overshoot is minimum, and the temperature stabilizes to the set point. The ramp-up rate of temperature may be set to 24° C. per minute. The ramp-down was allowed naturally. The thermal treatment may be conducted at a temperature of about 1000° C. for an hour or longer. This may be deemed one thermal treatment.

Figure 6:
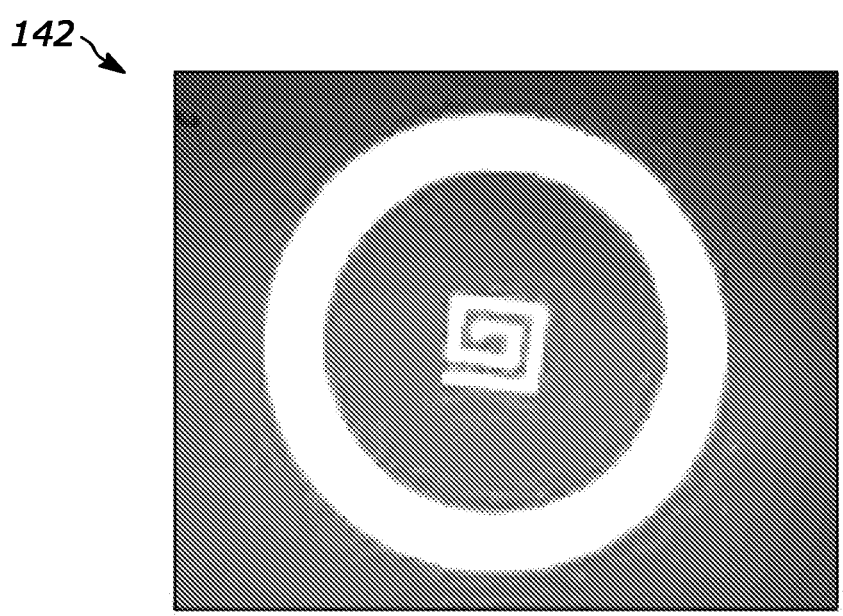
FIG. 6 is a top view of a pattern in accordance with some embodiments.

Referring to FIG. 6, an image of a pattern 142, similar to the identification pattern described with reference to FIG. 3B, is illustrated. The image of the pattern 142 was taken using an Olympus UC30 camera mounted on an Olympus BX51 microscope with an optical magnification of twenty times.

Figure 7A:
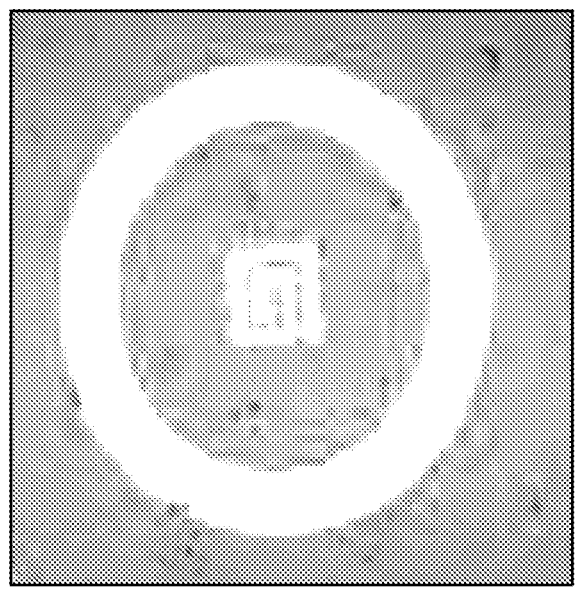
FIG. 7A is a top view of a pattern in accordance with some embodiments.
Figure 7B:
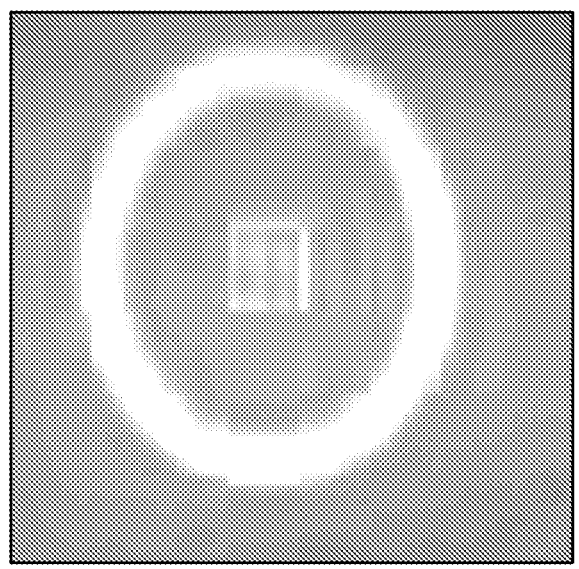
FIG. 7B is a top view of the pattern of FIG. 7A after thermal cycling in accordance with some embodiments.
Figure 8A:
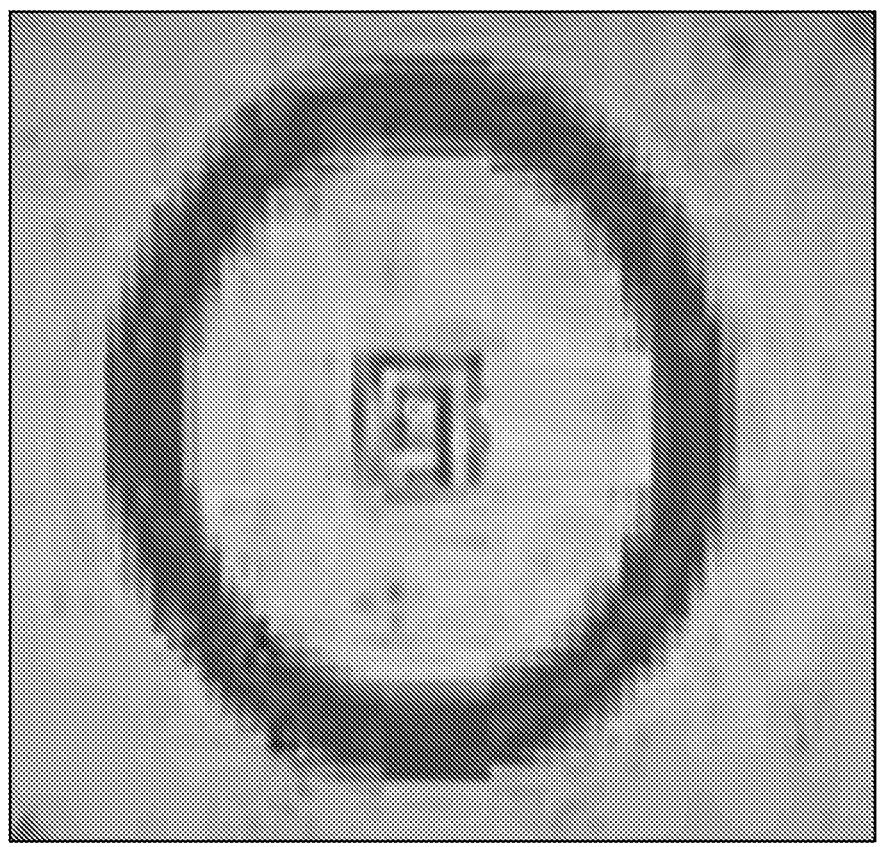
FIG. 8A is a top view of a pattern in accordance with some embodiments.
Figure 8B:
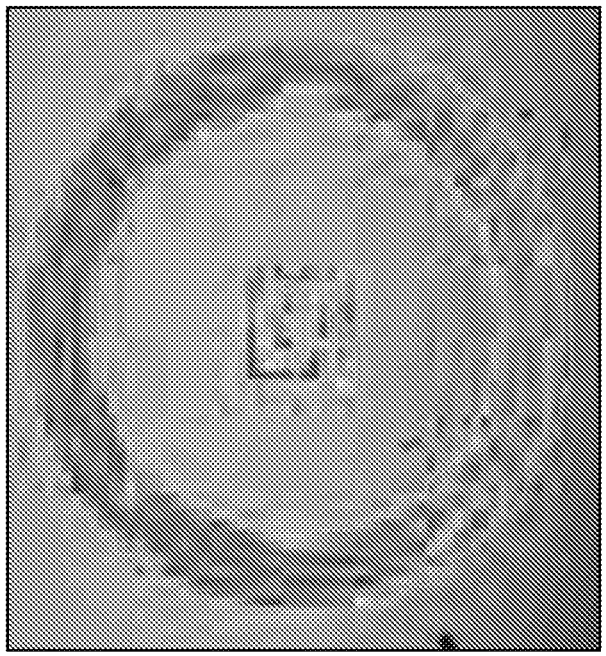
FIG. 8B is a top view of the pattern of FIG. 8A after thermal cycling in accordance with some embodiments.
Figure 9A:
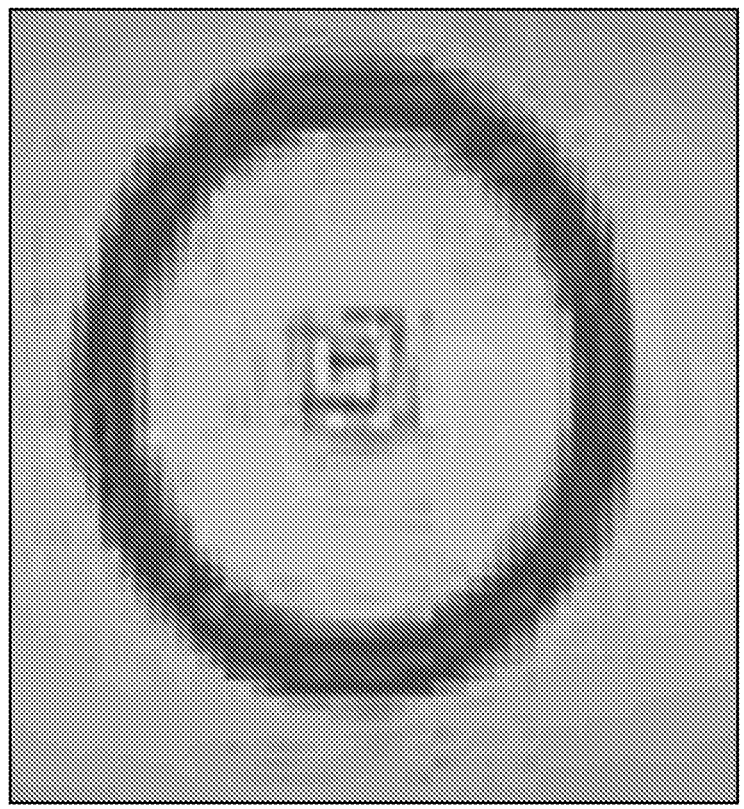
FIG. 9A is a top view of a pattern in accordance with some embodiments.
Figure 9B:
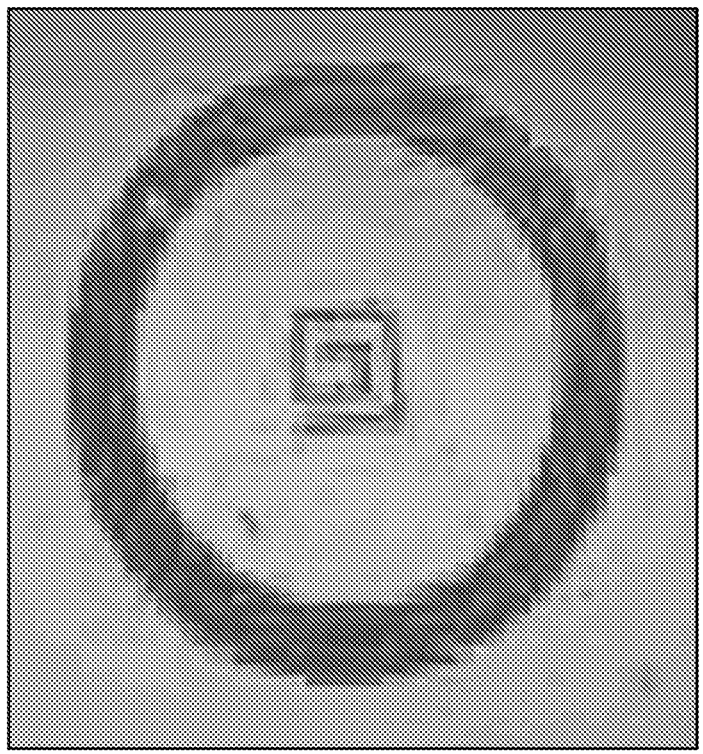
FIG. 9B is a top view of the pattern of FIG. 9A after thermal cycling in accordance with some embodiments.
Figure 10A:
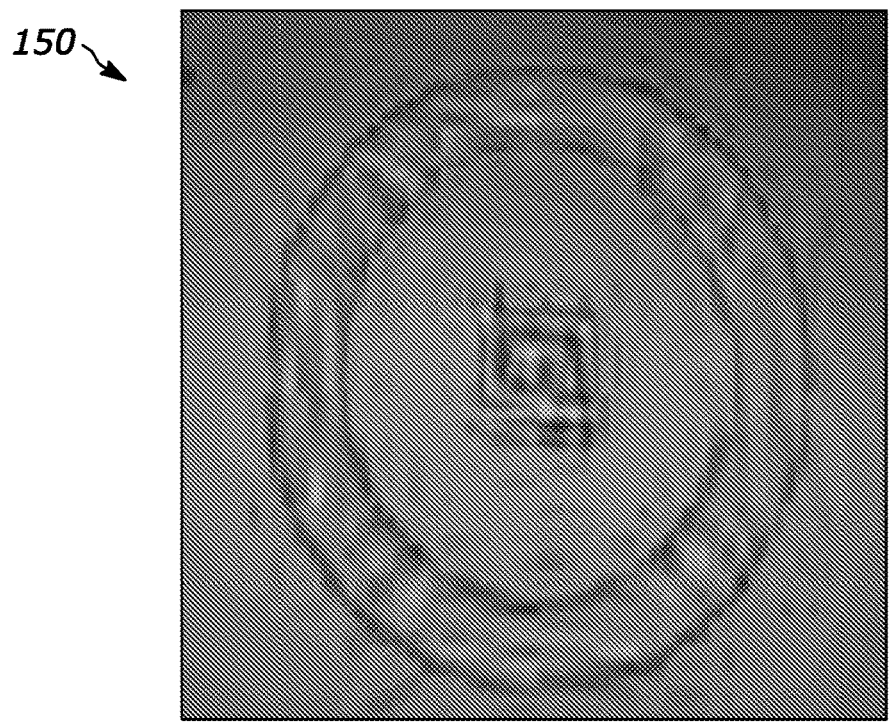
FIG. 10A is a top view of a pattern in accordance with some embodiments.
Figure 10B:
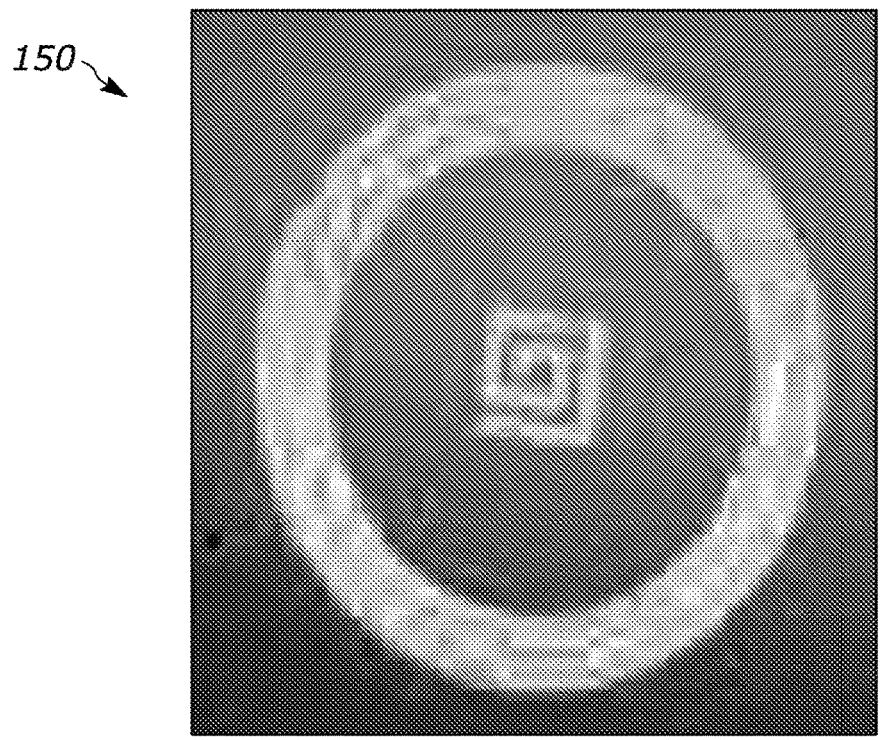
FIG. 10B is atop view of the pattern of FIG. 10A after thermal cycling in accordance with some embodiments.
Figure 11A:
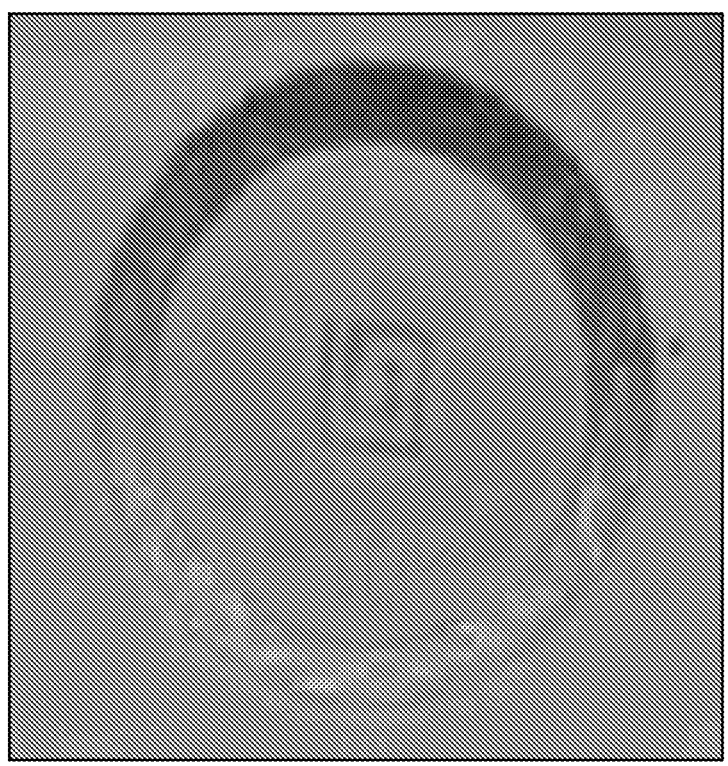
FIG. 11A is a top view of a pattern in accordance with some embodiments.
Figure 11B:
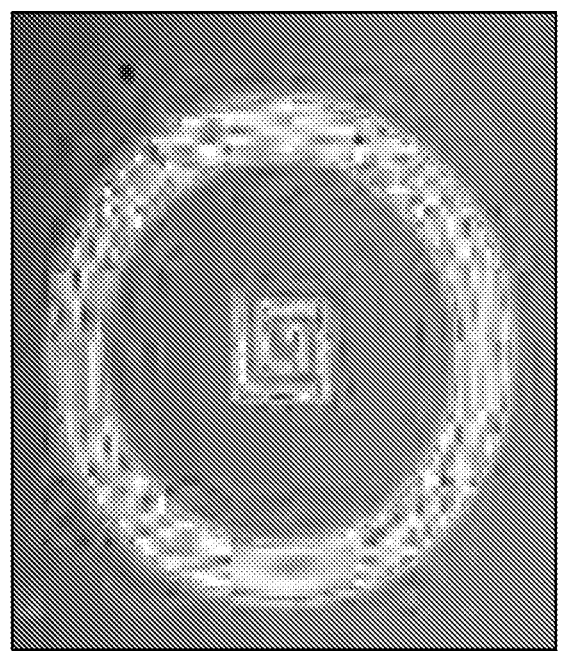
FIG. 11B is a top view of the pattern of FIG. 11A after thermal cycling in accordance with some embodiments.

Referring to FIGS. 7A and 7B illustrate images of patterns before, FIG. 7A, and after, FIG. 7B, thermal cycling. Likewise, FIGS. 8A to 11B illustrate images of patterns 144, 146, 148, 150, 152 before (A) and after (B) thermal cycling. The thermal cycling was done in one hour intervals for 6 thermal cycles for FIGS. 7A to 11B. These patterns, similar to that described with reference to FIG. 3B, underwent thermal treatment, similar to that described with reference to FIGS. 5A to 5C. Some of the patterns have been coated in a layer of aluminum oxide. In one illustrative embodiment, a 20 nm masking layer of aluminum oxide is deposited on the surface thereof using ALD, as illustrated by sample E in FIG. 13.

As shown in FIG. 7A, as compared to FIG. 7B, the pattern 144 may undergo a color change after thermal cycling. This may be due to small changes in the thickness of the refractive film. However, as illustrated in FIG. 7B, the pattern 144 remains intact and at least partially recognizable after thermal cycling.

Figure 12A:
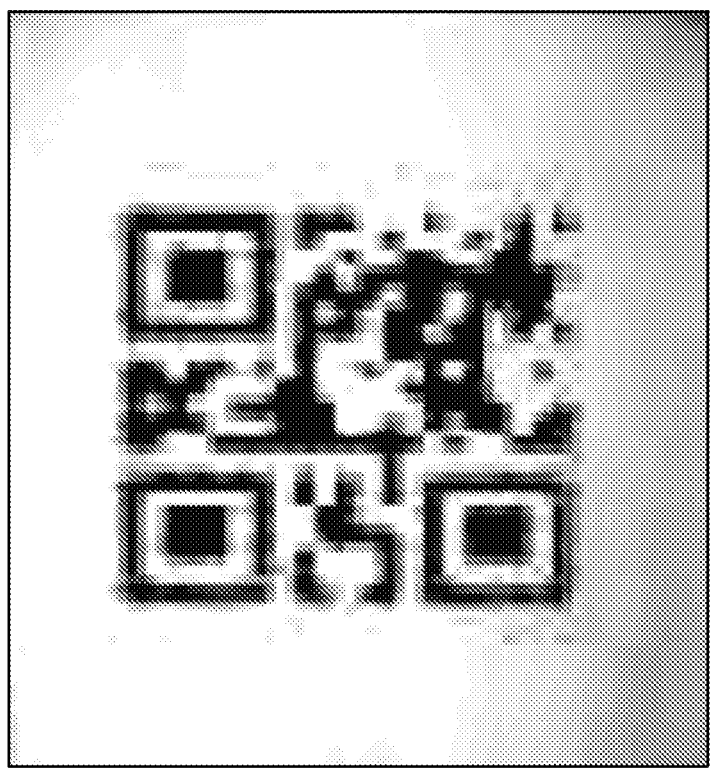
FIG. 12A is a top view of a pattern in accordance with some embodiments.
Figure 12B:
FIG. 12B is a top view of the pattern of FIG. 12A after fifteen hours of thermal cycling.
Figure 12C:
FIG. 12C is a top view of the pattern of FIG. 12A after forty hours of thermal cycling.

Referring to FIGS. 12A to 12C, a pattern 154 has been etched into the refractive film, creating the thickness modulated film, similar to that described above. In this illustrative embodiment, the pattern 154 has been printed and etched such that the pattern 154 is a quick response (QR) code. The pattern 154 may be etched in such a way that the pattern 154 may be scanned, sensed, and/or read using an optical sensor. This may include a barcode, a print microscopic pattern, a QR code, or an identification number. These patterns may be traceable to a component they are affixed to.

FIG. 12A illustrates the QR code etched into the refractive film. FIG. 12B illustrates the pattern 154 after fifteen hours of thermal cycling. FIG. 12C illustrates the pattern 154 after forty hours of thermal cycling. In some embodiments, the pattern 154 may be optically readable after forty hours of thermal cycling. Optical readability, or optical visibility, is the process to quantify how the intensity of reflected light depends on various factors such as the source spectrum, oxide thickness, and the refractive index of the oxide. As used and discussed herein, the optical readability of a pattern can be imaged by any instrument utilizing visible light quantified by a visibility parameter from the equation below.

The visibility may be determined using Michelson's Contrast equation:

$$\text{Visibility} = (I_{max} - I_{min})/(I_{max} + I_{min})$$

Here, $I_{max}$ and $I_{min}$ may be determined by the intensity of light from the background, such as the unetched refractive film, and the intensity of reflected light from the pattern, such as the thickness modulated film. $I_{max}$ may be defined by the larger measured intensity between the intensity of the background and the intensity of the pattern. $I_{min}$ may be defined by the smaller measured intensity between the intensity of the background and the intensity of the pattern. In some embodiments, the pattern may be visible and read if the intensity of reflected light from the pattern is greater than the background. In other embodiments, the pattern may be visible and read if the intensity of light from the pattern is different than the intensity light of the background, such that the background intensity may be higher.

Figure 14:
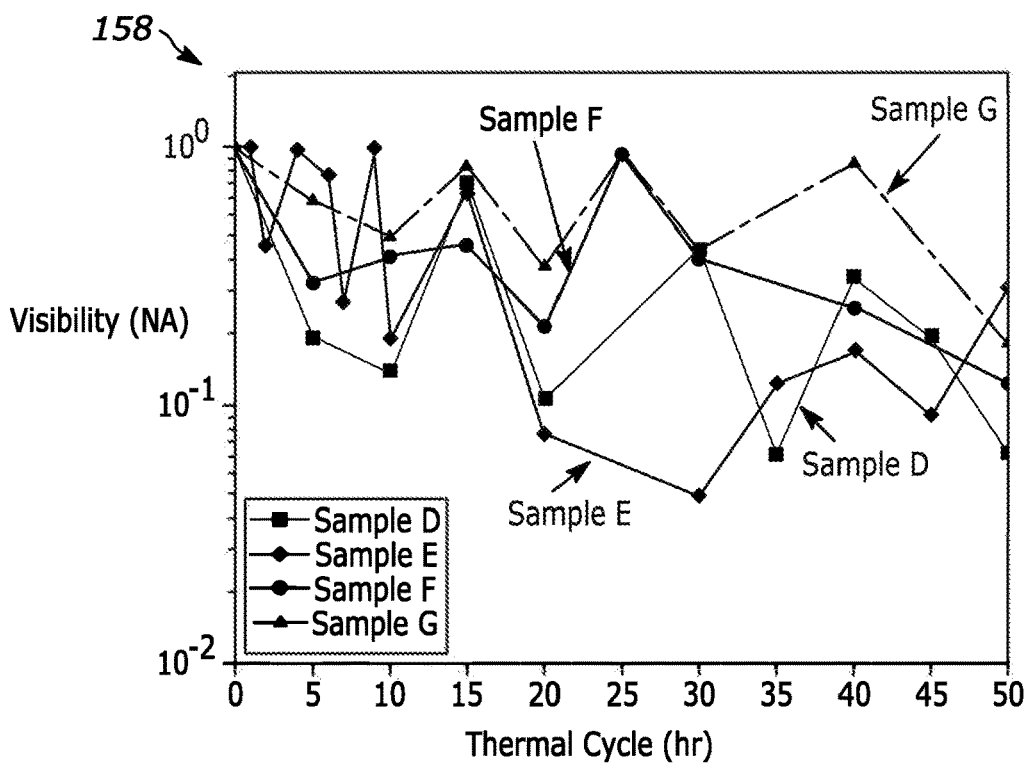
FIG. 14 is a graph illustrating visibility vs. thermal cycles in accordance with some embodiments.

As described herein, the pattern may be captured by an instrument utilizing visible light if the visibility parameter is greater than or equal to 0.01, as shown as the x-axis of FIG. 14.

In some embodiments, the pattern may be stable such that the pattern is visible and/or readable at a temperature of about −273.14° C. to 1350° C. for a period of at least forty hours. In further embodiments, the pattern may be stable such that the pattern is visible and/or readable at a temperature of about −273.14° C. to 1350° C. at a pressure range of about 1 micro Pascal to about 100 Giga Pascal for a period of at least forty hours. In yet further embodiments, the pattern may be stable such that the pattern is visible and/or readable in high vacuum, at a pressure less than $10^{-10}$ torr, and/or extreme humidity conditions, ranging from 0% to 100% humidity.

By way of example, the marker may be utilized within and/or on turbine engines, automobiles, research instruments, jet engines, gas turbines, steam turbines, and other applications where harsh, high temperature environments may exist.

Figure 13:
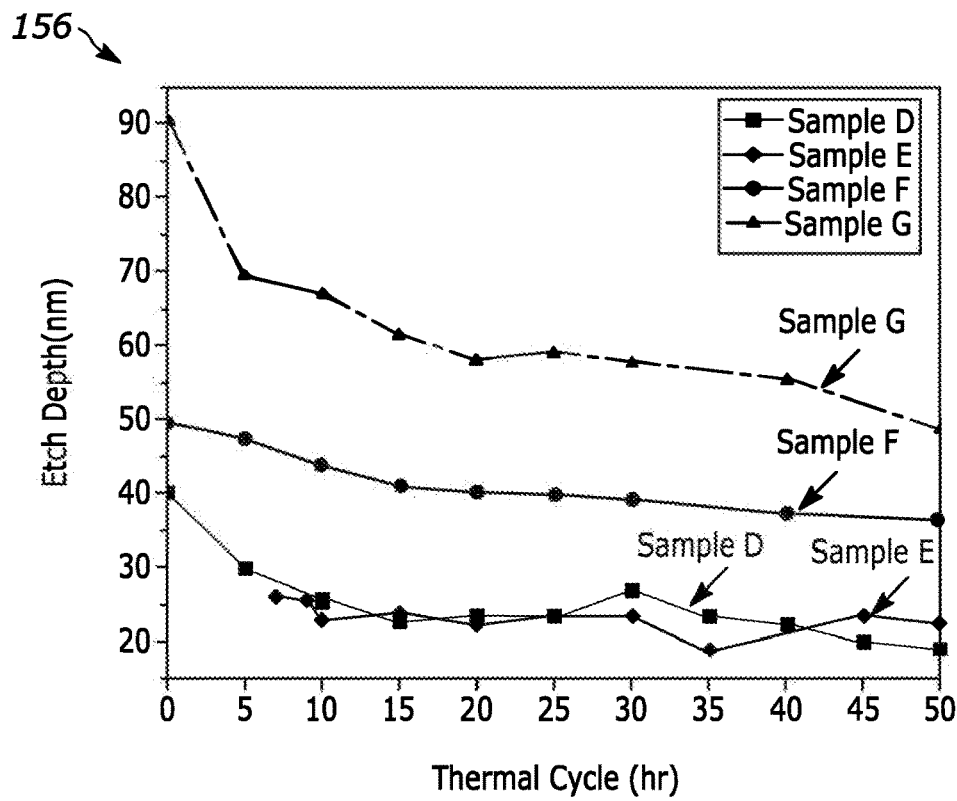
FIG. 13 is a graph illustrating etch depth vs. thermal cycles in accordance with some embodiments.

Referring to FIG. 13, a graph 156 is shown. Samples D, E, F, and G are illustrated showing the etch depth of a pattern on the y-axis and the thermal cycles in hours at 1000° C. on the x-axis. Sample D and E have the same etch depth of approximately 40.1 nm. Sample F has an etch depth of approximately 49.4 nm. Sample G has an etch depth of approximately 90.3 nm. The graph 156 illustrates how the etch depth may be affected by thermal cycling. The graph 156 illustrates a slight decrease in etch depth as the thermal cycling begins and appears to stabilize after around ten thermal cycles.

Referring to FIG. 14, a graph 158 is shown. Samples D, E, F, and G are illustrated with visibility on the y-axis and the thermal cycles in hours on the x-axis. The y-axis is plotted as a logarithmic scale. The samples have approximately the same etch depth of a pattern as that described above with reference to FIG. 13. Fifty thermal cycles at 1000° C. were conducted. The visibility was calculated using Michelson's Contrast equation explained above. The graph 158 illustrates a general decrease in the visibility of the sample over successive thermal cycles, but the samples were still visible after the fifty thermal cycles, and in some instance may become more visible due to color changes associated with the changing etch depth, similar to that discussed above with reference to FIGS. 2A and 2B.

More specifically, the graph 158 illustrates the visibility parameter fluctuating around a visibility parameter of about 0.1. As shown, over fifty thermal cycles, the visibility parameter of the samples D, E, F, and G remain above zero. As stated above, the pattern may be captured by an instrument utilizing visible light if the visibility parameter is greater than or equal to 0.01, the a-axis. Because of this, graph 158 illustrates that the pattern is capable of being captured by an instrument utilizing visible light after at least 50 thermal cycles.

Figure 15:
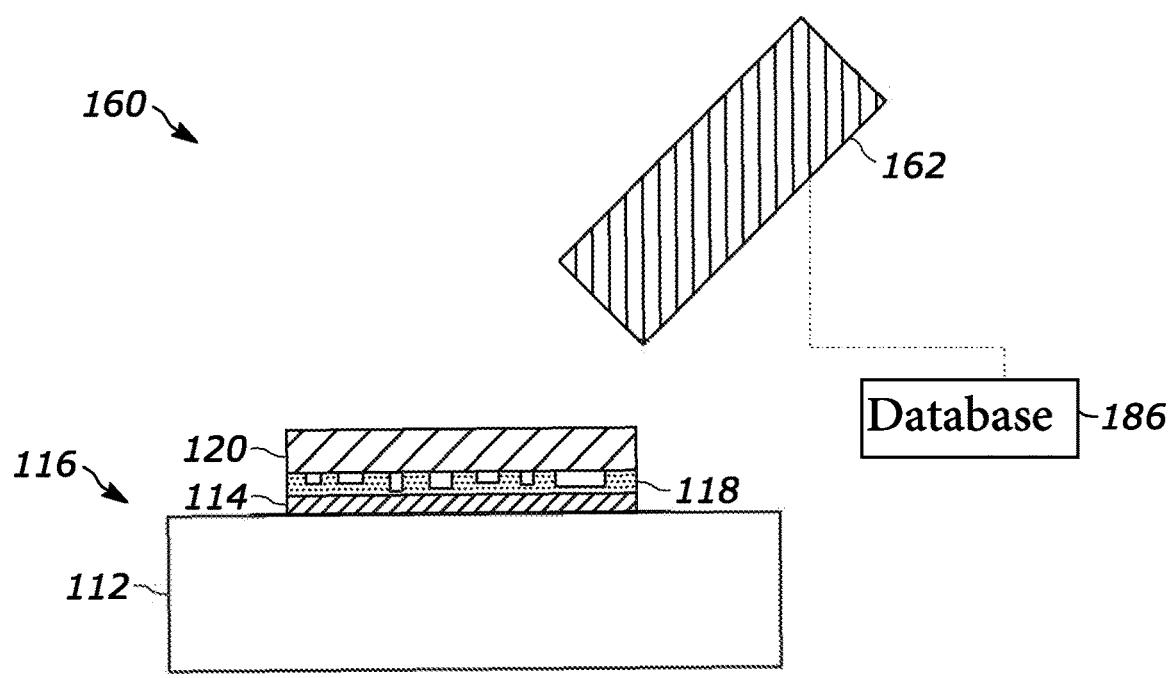
FIG. 15 is a system block diagram for scanning a marker in accordance with some embodiments.

Referring to FIG. 15, a system is illustrated for scanning a marker in accordance with some embodiments. The system 160 comprises a sensor 162, and the marker 116 (see FIG. 3B). The marker 116 is comprised of the dielectric base material 112, the refractive film 114, the thickness modulated film 118, and the refractive coating 120. The sensor 162 may scan the pattern created on or by the thickness modulated film 118 and the refractive film 114. The system include a database 186 to store the sensed or scanned pattern to link the pattern to a component, described in more detail below.

Figure 16:
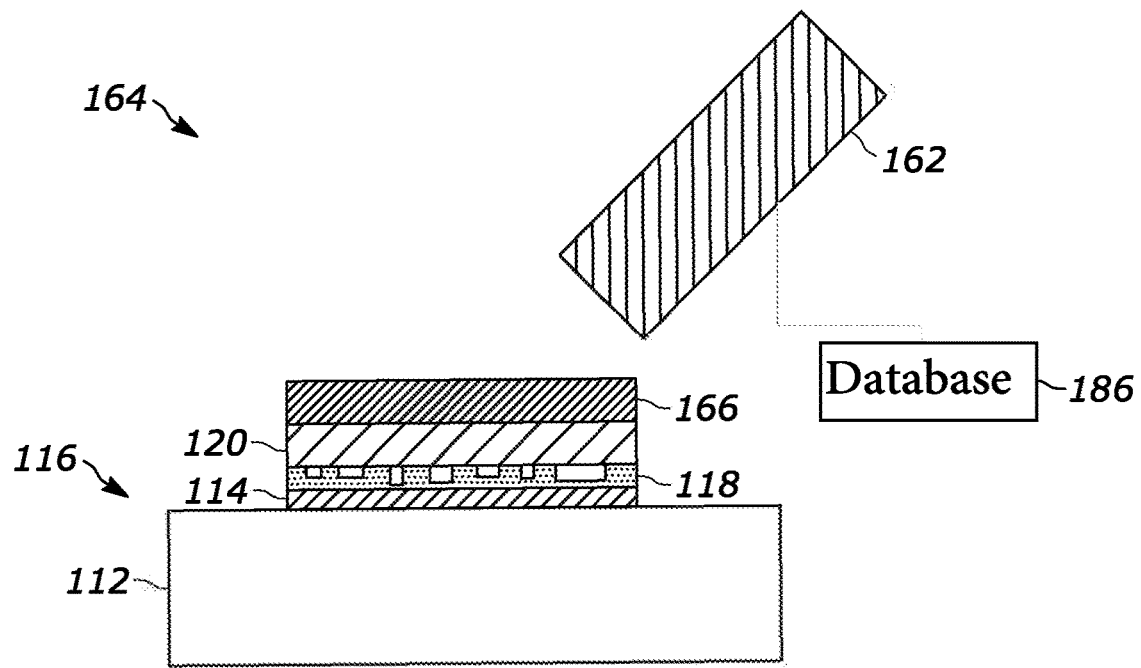
FIG. 16 is an elevational view of a system for scanning a marker in accordance with some embodiments.

Referring to FIG. 16, a system is illustrated for scanning a marker in accordance with some embodiments. The system 164 comprises the sensor 162, and the marker 116 (see FIG. 3B). The marker 116 is comprised of the dielectric base material 112, the refractive film 114, the thickness modulated film 118, and the refractive coating 120. The sensor 162 may scan the pattern (e.g., patterns 144, 146, 148, 150, 152) created on or by the thickness modulated film 118 and the refractive film 114. The system include a database 186 to store the sensed or scanned pattern to link the pattern to a component, described in more detail below.

In some embodiments, the marker 116 may be coated with a thermal barrier coating 166. The thermal barrier coating 166 may be deposited over the marker 116 to shield the marker 116 from excess heat of the environment. The thermal barrier coating 166 may also aid protecting the marker 116 from dust and debris in the environment that may contact and/or settle on the surface of the marker 116. Additionally, the thermal barrier coating 166 may allow the marker 116 to remain visible for a longer period of time over more heating cycles.

Figure 17A:
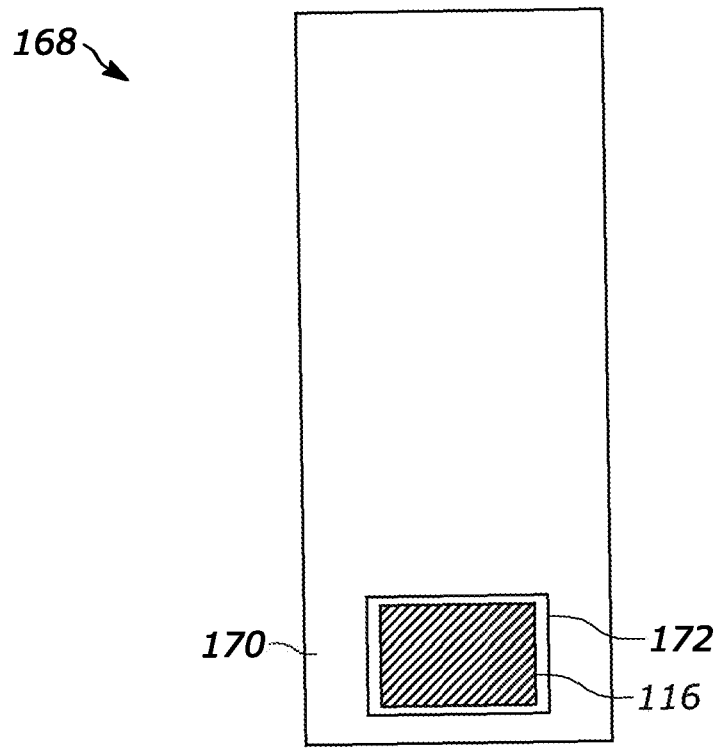
FIG. 17A is a top view of a marker disposed on a surface of a component in accordance with some embodiments.

Referring to FIG. 17A there is illustrated a marker disposed on a surface of a component in accordance with some embodiments. A component 168, such as a turbine blade, is illustrated having abase metal material 170, the marker 116, and an adhesive layer 172. The adhesive layer 172 may affix the marker 116 to the base metal material 170. The adhesive layer 182 may comprise of one or more of a high temperature adhesive, glue, or cement. Affixing the marker 116 to the base metal material 170 may be achieved by one or more of electrode-positioning, brazing, cladding, welding, spraying, coating, or embedding either in conjunction with or in replacement of the adhesive layer 182.

Figure 17B:
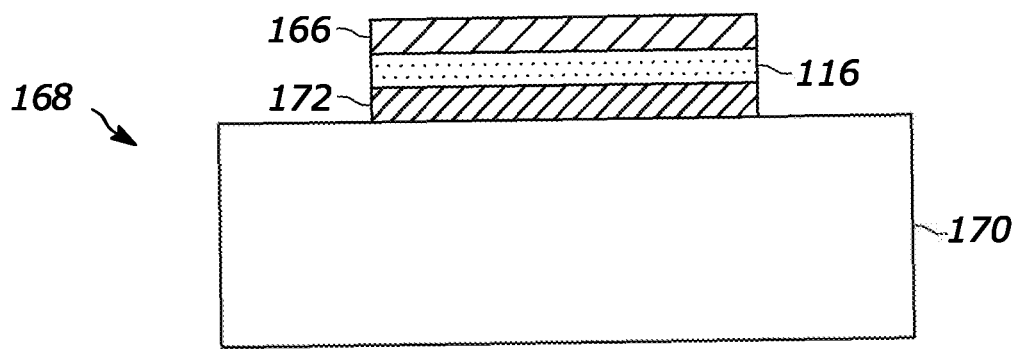
FIG. 17B is an elevational view of a marker disposed on a surface of a component in accordance with some embodiments.

Referring to FIG. 17B there is illustrated a marker disposed on a surface of a component in accordance with some embodiments. Like FIG. 17A, the marker 116 is affixed to the base metal material 170 via an adhesive layer 182. The marker 116 may be coated with the thermal barrier coating 166. In some embodiments, the base metal material 170 may also be coated with the thermal barrier coating 166. In some embodiments, the marker 116 may be exposed through the thermal barrier coating 166. The thermal barrier coating 166 provides and/or acts as a barrier to oxygen diffusion that may change the overall thickness of the pattern created on or by the thickness modulated film 118 and the refractive film 114 which may decrease the visibility parameter. Aluminum oxide may be used as the thermal barrier coating 166, however other materials, such as different oxides including those similar to aluminum oxide as contemplated herein.

Figure 18:
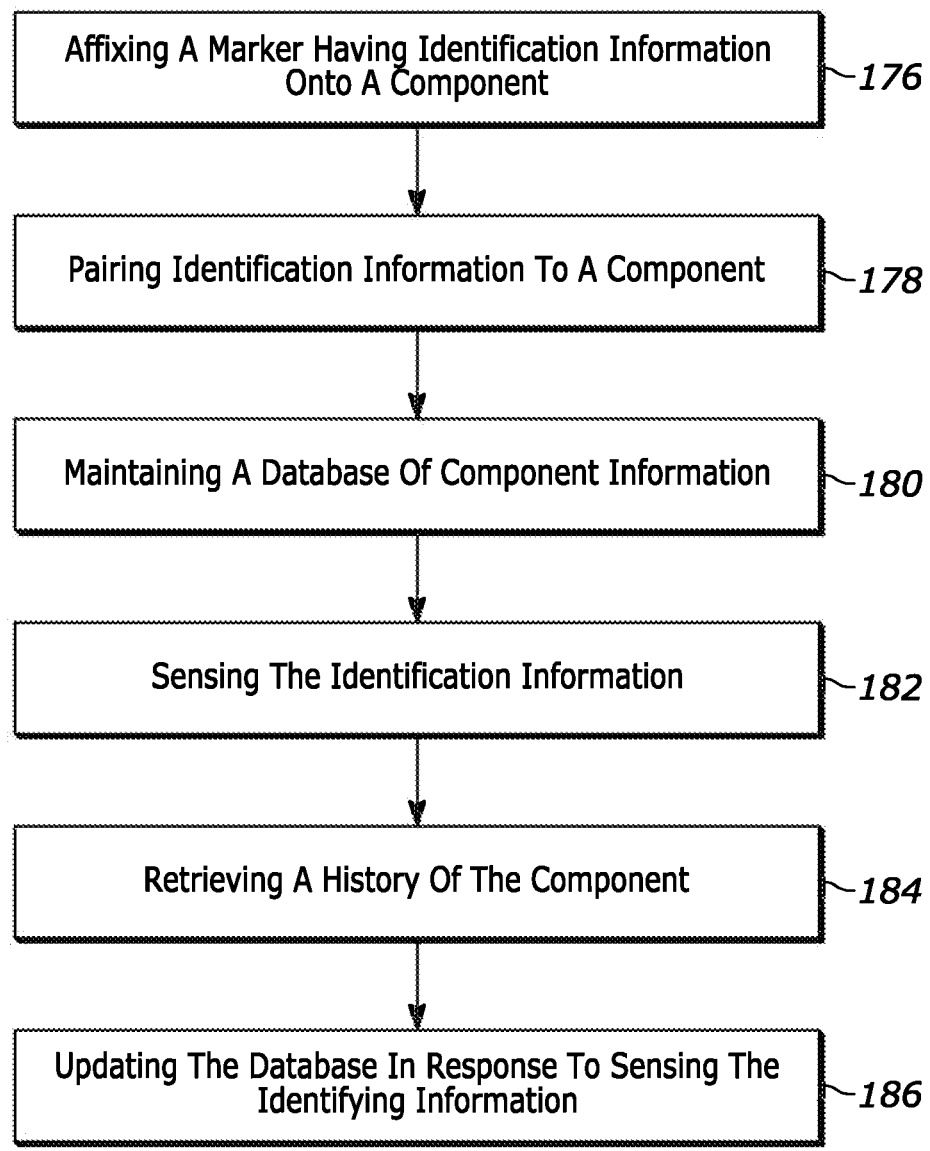
FIG. 18 is flowchart for an exemplary method of tracking a component in accordance with some embodiments.

Referring to FIG. 18, there is an exemplary method 174 of tracking a component in accordance with some embodiments. For example, the method 174 and/or one of more of the steps of the method 174 are applicable to one of more of the embodiments described herein. The method 174 includes a step 176 of affixing a marker having identification information onto a component. In addition, the method 174 includes a step 178 of pairing the identification information to a component (e.g., component information). The method 174 further includes a step 180 of maintaining the database 186 of component information. Further, the method 174 includes a step 182 of sensing the identification information with a sensor 162. Moreover, the method 174 includes a step 184 of retrieving a history of the component based on the sensed identification information. The method also includes a step 186 of updating the database 186 of component information in response to sensing the identifying information.

The marker 116 may be affixed to the component 168 before assembly of the system, for example a turbine engine. After the marker 116 is affixed, and the system is assembled, the marker 116 may subsequently be scanned using the sensor 162. This may be accomplished using borescope openings in the casing of the turbine engine where the sensor 162 may be inserted to scan the marker 116. The sensor 162 may use optical sensing via an optical sensor such as a camera to yield a visual inspection of the marker 116. In some embodiments, the sensor 162 may utilize optical, ultraviolet, infrared scanning, or acoustic scanning. In some embodiments utilizing the thermal barrier coating 166, acoustic scanning may be used. In some embodiments, magnetic scanning may be used. In some embodiments, the pattern may be disposed on the component 168 itself.

The sensor 162 may contain one or more processors. The processors may be configured to communicate with the sensor 162 across a communication network (e.g., LAN, WAN, Internet). The sensor 162 may scan the marker 116 to sense, interpret, or read the identification pattern or information contained on the surface of the marker 116 from the thickness modulated film 118. The processor may communicate the sensed identification information to the processor, which may communicate and reference the database 186. The database 186 may map or pair the identification pattern to a component that the marker 116 is affixed to. After pairing, subsequent scans may allow for the database 186 to log, track, or maintain a record or history of scans of the sensed identification information, and thus track the components scans. Mapping or pairing of the identification pattern to a component may occur before or after the marker 116 is affixed to the component 168. Likewise, coating with the thermal barrier coating 166 may occur before or after the marker 116 is affixed; thus, the marker 116 may be attached to the component 168 which already includes the thermal barrier coating 166.

An image of the component 168 containing the marker 116 may be taken with an inspection device, such as an optical sensor inserted through a borescope opening. The pattern may be scanned, read, and/or sensed from the image. This may allow for tracking of the component during an inspection image of the component 168. Having the marker 116 affixed to the component 168 in an exposed position allows for the marker to be scanned, read, and/or sensed in an assembled and/or on-wing state. The marker 116 may contain a pattern that is unique to the component 168 such that different components within the turbine engine have different patterns from one another.

The marker 116 may be used in high or low temperature and/or pressure environments. The high and low temperature environment may be, for example, from about −273.14° C. to 1350° C. In one illustrative embodiment the high temperature environment may be about 1200° C. in the hot flowpath of a turbine engine. The high and low pressure environment may be, for example, from about 1 micro Pascal to 100 Giga Pascal.

The marker 116 may be used on components in these high or low temperature and/or pressure environments. In one illustrative embodiment, the marker 116 may be used on components of a turbine engine. The marker 116 may further be utilized in automotive applications such as for components in and throughout the engine and exhaust system. Other applications of the marker 116 may be in heavy machinery industries such as turbines for use in power applications such as wind turbines and turbines used within hydroelectric dams. The marker 116 may also be used in cryogenic industries and/or applications. Other industries including high temperature environments where the marker 116 may be utilized may be, for example, nuclear reactors, boilers, and chimneys. Finally, the marker 116 may be used throughout the aerospace industry including space vehicles, such as rockets.

Further aspects of the disclosure are provided by the subject matter of the following clauses:

A marker including: a dielectric base material; a refractive film, having etching, disposed onto the dielectric base material to obtain a thickness modulated film; and a coating of refractive material disposed on the thickness modulated film to obtain an identification pattern.

The marker of any preceding clause, wherein the identification pattern is stable in a temperature of about −273.14° C. to 1350° C. for a period at least 40 hours.

The marker of any preceding clause, wherein the identification pattern is stable in a pressure range of about 1 micro Pascal to 100 Giga Pascal.

The marker of any preceding clause, wherein the identification pattern includes one or more of a barcode, a print microscopic pattern, and a QR code.

The marker of any preceding clause, wherein the etching of the refractive film includes one or more of a dry etching process and a wet etching process.

The marker of any preceding clause, wherein the refractive film includes one or more of oxides, carbides, nitrides, and fluorides.

The marker of any preceding clause, wherein the refractive film has a thickness of about 500 Angstrom to 3900 Angstrom.

The marker of any preceding clause, wherein the dielectric base material includes one or more of silicon, germanium, titanium, doped silicon, doped germanium, and doped titanium.

The marker of any preceding clause, wherein the thickness modulated film has thickness modulation of about 5 nanometers to 390 nanometers.

The marker of any preceding clause, wherein the refractive material includes one or more of barium fluoride, calcium fluoride, lanthanum fluoride, magnesium fluoride, hafnium oxide, silicon dioxide, aluminum oxide, or titanium nitride.

The marker of any preceding clause, wherein the marker is affixed onto a component for use in a hot flowpath of a gas turbine engine.

A method including: affixing the marker onto the component, wherein the refractive film includes the identification pattern; and pairing the identification pattern of the marker to the component.

The method of any preceding clause, wherein the identification pattern is stable at a temperature of about −273.14° C. to 1350° C.

The method of any preceding clause, further including the steps of: maintaining a database of component pattern for the component; sensing the identification pattern of the marker of the component; retrieving a history of the component from the database of component pattern; and updating the database of component pattern for the component in response to sensing the identification pattern of the marker of the component.

The method of any preceding clause, wherein affixing the marker onto the component at least one of electrodepositioning, brazing, cladding, welding, spraying, coating, and embedding.

The method of any preceding clause, further including affixing the marker onto the component for use in a hot flowpath of a gas turbine engine.

The method of any preceding clause, further including coating the marker with a thermal barrier material.

The method of any preceding clause, further including coating the component with the thermal barrier material.

The method of any preceding clause, wherein sensing the identification pattern of the marker includes at least one of optical, ultraviolet, infrared scanning, and acoustic scanning.

The method of any preceding clause, wherein sensing the marker includes visual inspection of the marker via a camera.

The method of any preceding clause, wherein the marker contains pattern traceable to an identification number.

The method of any preceding clause, wherein the identification pattern includes one or more of a barcode, a print microscopic pattern, and a QR code.

A method for making the marker including: etching the refractive film on the dielectric base material to obtain the thickness modulated film; and coating the thickness modulated film with the refractive material to obtain the identification pattern; wherein, the identification pattern is stable at a temperature of about −273.14 degrees centigrade to about 1350 degrees centigrade for a period at least 40 hours.

The method of any preceding clause, wherein the identification pattern is stable at a pressure in a range from about 1 micro Pascal (Pa) to about 100 Giga Pascal (GPa).

The method of any preceding clause, wherein the identification pattern includes at least one of a barcode, a print microscopic pattern, and a QR code.

The method of any preceding clause, wherein etching the refractive film is selected from at least one of a dry etching process and a wet etching process.

The method of any preceding clause, wherein the refractive film is selected from group including at least one of oxides, nitrides, and fluorides.

The method of any preceding clause, wherein the refractive film has a thickness in a range from about 50 Angstrom to about 3900 Angstrom.

The method of any preceding clause, wherein the dielectric base material includes at least one of silicon, germanium, titanium, doped silicon, doped germanium, and doped titanium.

The method of any preceding clause, wherein the thickness modulated film has thickness modulation in a range from about 5 nanometers to about 390 nanometers).

The method of any preceding clause, wherein the refractive material includes at least one of barium fluoride, calcium fluoride, lanthanum fluoride, magnesium fluoride, hafnium oxide, silicon dioxide, aluminum oxide, and titanium nitride.

The method of any preceding clause, wherein the dielectric base material is affixed to a component for use in a hot flowpath of a gas turbine engine.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the disclosure concept.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A marker comprising:
   a dielectric base material;
   a refractive film, having etching, disposed onto the dielectric base material to obtain a thickness modulated film; and
   a coating of refractive material disposed on the thickness modulated film to obtain an identification pattern,
   wherein a spectral distribution of light is associated with the identification pattern, and wherein the spectral distribution of light is dependent on at least two of the refractive film, the thickness modulated film, the dielectric base material, and a silicon interface between the refractive film and the dielectric base material.

2. The marker of claim 1, wherein the identification pattern is stable in a temperature of about −273.14° C. to 1350° C. for a period at least 40 hours, and wherein the identification pattern is stable in a pressure range of about 1 micro Pascal to 100 Giga Pascal.

3. The marker of claim 1, wherein the identification pattern comprises one or more of a barcode, a print microscopic pattern, and a QR code.

4. The marker of claim 1, wherein the etching of the refractive film comprises one or more of a dry etching process and a wet etching process.

5. The marker of claim 1, wherein the refractive film has a thickness of about 500 Angstrom to 3900 Angstrom.

6. The marker of claim 1, wherein the marker is affixed onto a component for use in a hot flowpath of a gas turbine engine.

7. A method comprising:
   affixing a marker onto a component, wherein the marker includes:
      a dielectric base material;
      a refractive film, having etching, disposed onto the dielectric base material to obtain a thickness modulated film; and
      a coating of refractive material disposed on the thickness modulated film to obtain an identification pattern wherein the refractive film includes the identification pattern;
   pairing the identification pattern of the marker to the component;
   maintaining a database of component pattern for the component;

sensing the identification pattern of the marker of the component;

retrieving a history of the component from the database of component pattern; and updating the database of component pattern for the component in response to sensing the identification pattern of the marker of the component.

8. The method of claim 7, wherein the identification pattern is stable at a temperature of about −273.14° C. to 1350° C.

9. The method of claim 7, further comprising affixing the marker onto the component for use in a hot flowpath of a gas turbine engine.

10. The method of claim 9, further comprising coating the marker with a thermal barrier material.

11. The method of claim 10, further comprising coating the component with the thermal barrier material.

12. The method of claim 7, wherein sensing the identification pattern of the marker includes at least one of optical, ultraviolet, infrared scanning, and acoustic scanning.

13. The method of claim 7, wherein sensing the marker includes visual inspection of the marker via a camera.

14. The method of claim 7, wherein the marker contains pattern traceable to an identification number.

15. The method of claim 7, wherein the identification pattern comprises one or more of a barcode, a print microscopic pattern, and a QR code.

16. A method for making a marker comprising:
disposing a refractive film onto a dielectric base material;
etching the refractive film on the dielectric base material to obtain a thickness modulated film; and
coating the thickness modulated film with a refractive material to obtain an identification pattern;
wherein, the identification pattern is stable at a temperature of about −273.14 degrees centigrade to about 1350 degrees centigrade for a period at least 40 hours.

17. The method of claim 16, wherein the identification pattern includes at least one of a barcode, a print microscopic pattern, and a QR code.

18. The method of claim 16, wherein the thickness modulated film has thickness modulation in a range from about 5 nanometers to about 390 nanometers.

19. The method of claim 16, wherein the dielectric base material is affixed to a component for use in a hot flowpath of a gas turbine engine.

* * * * *